(12) United States Patent
Corradi

(10) Patent No.: US 7,832,144 B2
(45) Date of Patent: Nov. 16, 2010

(54) HYDROPONIC GROWING SYSTEM

(75) Inventor: Laurent Corradi, Bandol (FR)

(73) Assignee: Marie-Christine Steffanetti, New York, NY (US)

( * ) Notice: Subject to any disclaimer, the term of this patent is extended or adjusted under 35 U.S.C. 154(b) by 434 days.

(21) Appl. No.: 11/961,148

(22) Filed: Dec. 20, 2007

(65) Prior Publication Data

US 2009/0007486 A1 Jan. 8, 2009

Related U.S. Application Data

(60) Provisional application No. 60/876,213, filed on Dec. 21, 2006.

(51) Int. Cl.
*A01G 31/00* (2006.01)
*A01G 31/02* (2006.01)

(52) U.S. Cl. ........................................ 47/62 R; 47/59 S

(58) Field of Classification Search ................ 47/59 R, 47/62 R, 62 A, 62 C, 62 E, 62 N, 63, 82, 47/83
See application file for complete search history.

(56) References Cited

U.S. PATENT DOCUMENTS

| | | | | |
|---|---|---|---|---|
| 4,035,950 A | * | 7/1977 | Anselm | 47/59 R |
| 4,161,085 A | | 7/1979 | Moffett, Jr. | |
| 4,295,296 A | | 10/1981 | Kinghorn | |
| 4,332,105 A | * | 6/1982 | Nir | 47/1.01 R |
| 4,454,684 A | | 6/1984 | O'Hare | |
| 4,884,366 A | * | 12/1989 | Morton | 47/62 C |
| 5,136,807 A | | 8/1992 | Orlov | |
| 5,184,420 A | * | 2/1993 | Papadopoulos et al. | 47/62 N |
| 5,287,650 A | | 2/1994 | Moriguchi et al. | |
| 5,615,519 A | | 4/1997 | Abe et al. | |
| 6,499,249 B1 | * | 12/2002 | Luijkx | 47/41.01 |
| 6,502,350 B1 | | 1/2003 | Dick | |
| 6,634,138 B2 | * | 10/2003 | Katzman | 47/79 |
| 6,727,091 B2 | * | 4/2004 | Darlington | 435/299.1 |
| 7,243,460 B2 | * | 7/2007 | Darlington | 47/62 R |
| 2005/0055879 A1 | | 3/2005 | Darlington | |
| 2008/0110086 A1 | * | 5/2008 | Julia | 47/64 |

FOREIGN PATENT DOCUMENTS

| | | |
|---|---|---|
| FR | 2634971 | 2/1990 |
| FR | 2680626 | 3/1993 |
| FR | 2747265 | 10/1997 |
| JP | 63317029 A * | 12/1988 |
| JP | 2003038049 A * | 2/2003 |

* cited by examiner

*Primary Examiner*—Rob Swiatek
*Assistant Examiner*—Danielle Clerkley
(74) *Attorney, Agent, or Firm*—Gottlieb, Rackman & Reisman

(57) ABSTRACT

The present invention relates to a system for growing plants hydroponically on a vertical wall. The system can be used to grow many different species of plants concurrently. The system comprises a specially designed wall together with an integrated and customizable automatic irrigation system for providing nutrients and water, with metered absorption of the nutrients and water by the plants and regulation of excess nutrients and water. The wall may be equipped with an automatic release system which releases the nutrients into the wall's absorbent covering.

13 Claims, 9 Drawing Sheets

HYDROPONIC GROWING SYSTEM

This application claims priority to U.S. provisional application 60/876,213, filed on Dec. 21, 2006.

FIELD OF THE INVENTION

The present invention relates generally to hydroponic horticultural systems and, more particularly, to a means for successfully growing plants hydroponically on a vertical wall with limited associated human intervention.

BACKGROUND OF THE INVENTION

Plants have been grown hydroponically for decades. In a hydroponic system, generally, plants are grown using mineral nutrients in an aqueous environment and without the aid of a purely soil base. In such a system, the root system of the plants must remain in a sufficiently aqueous environment in order to survive. In contrast, in traditional geoponic horticulture, the nutrients and water are distributed in soil and the plant uses its root system to extract nutrients and water from the soil.

Hydroponic horticulture can be appreciably more labor intensive than traditional geoponics in that the plant does not have a base in which nutrients are naturally stored and from which those nutrients may be extracted. For a plant to survive, space must therefore be apportioned for the plant to grow a root system. In addition, nutrients, including water, must be added and maintained at appropriate levels, which generally requires significant human intervention. Further, issues of water and nutrient loss through plant absorbsion, evaporation, and run-off must be addressed.

Hydroponic horticulture often is carried out indoors. It is therefore advantageous to achieve horizontal space savings by affording a platform for concurrently growing multiple plants along a vertical structure. In addition, because of the indoor use, the hydroponic structure must be compatible with plant growth as well as be aesthetically pleasing.

In general, prior art hydroponic systems entail plantings elevated above a pond or river-like body of water with root systems extending into the water. The problems with these systems are multi-facetted, but each results in significant human effort and intervention. For example, algae growth can be an issue and can require cleaning of the water. In addition, many plants cannot survive if fully under water, so a supporting structure for the live matter must be constructed and the live matter must be attached to the supporting structure so as to permit growth. As the plants grow, the plants need to have their positions adjusted relative to the supporting structure so that they can continue to grow freely. These types of issues generally are dealt with through various labor intensive ways or mechanisms.

Accordingly, it would be desirable to provide a hydroponic system which overcomes these disadvantages.

SUMMARY OF THE INVENTION

Generally speaking, in accordance with the present invention, a hydroponic growing system is provided. The present invention overcomes the aforementioned disadvantages and issues related to a system for growing plants hydroponically on a vertical wall. The system can be used to grow many different species of plants concurrently. The system comprises a specially designed wall comprising a plurality of absorbent layers. In addition, the system comprises an integrated and customizable automatic irrigation system for providing nutrients and/or water, with metered absorption of the nutrients and/or water by the plants and regulation of excess nutrients and water. The wall may be equipped with an automatic release system for releasing the nutrients and/or water into the wall's absorbent layers. In general, the wall, through its absorbent layers, retains the nutrients and/or water until accepted by the plants. The technology is suitable for use in creating small and large vertical gardens.

The irrigation system of the present invention includes metering and piping. The water pressure from the water flow causes the water to mix with nutrients and mixes nutrients into the water flow. The present invention comprises irrigation lines along the top of the wall. The irrigation lines selectively deliver water and nutrients to the wall for delivery to the plants. The irrigation system of the invention is advantageous in that it works on any size plant wall support. The wall may optionally be configured into zones, with different zones for specific live matter requiring different quantities or flow rates of water or nutrients.

Multiple manifolds are needed in order to configure the wall for multiple zones. When the wall is configured with multiple zones, each zone is presumed to require different amounts of water or nutrients and the irrigation system releases different amounts to the different zones. Each flow rate may be at a pre-set level, such as constant pre-set flow or pre-set flow based on time-of-day or day-of-week, or may instead be automatically adjusted based on the specific needs of the system.

The irrigation of the specified watering zones may be controlled by measuring humidity at or near the wall and controlling irrigation by retaining a selected range of humidity. Optionally, a humidity control unit may be included, piloted by a control process unit for control of watering. The humidity control unit sends feedback to the irrigation system in order to control the level of watering on a zone by zone basis.

Artificial lighting may also be added to further reduce human intervention. These lights will permit installation of a vertical garden indoors in low light areas.

It is an object of the present invention to provide a hydroponic growing system and apparatus.

It is yet another object of the present invention to clean and improve the air quality of a room by using special species of plants.

The invention accordingly comprises the several steps and the relation of one or more such steps with respect to each of the others, the device embodying the features of construction, combination of elements and arrangement of parts which are adapted to affect such steps, and the article which possess these characteristics, properties and relation of elements, all as exemplified in the detailed disclosure hereinafter set forth, and the scope of the invention will be indicated in the claims.

DESCRIPTION OF THE FIGURES

For a fuller understanding of the invention, reference is made to the following description taken in connection with the accompanying drawings, in which.

DETAILED DESCRIPTION OF THE EMBODIMENTS

Figure 1:
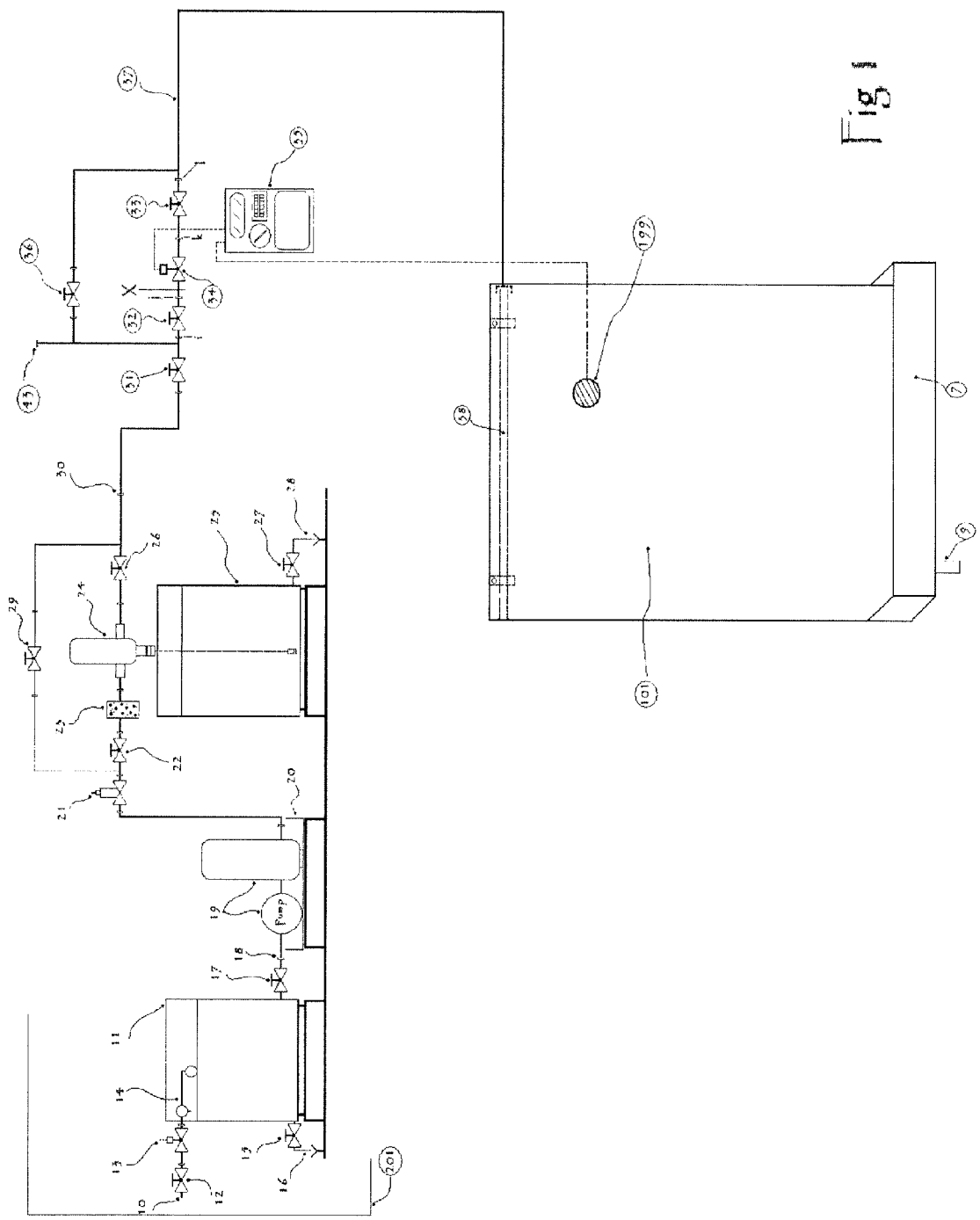
FIG. 1 is a schematic view showing a view of the complete inventive system.
Figure 3:
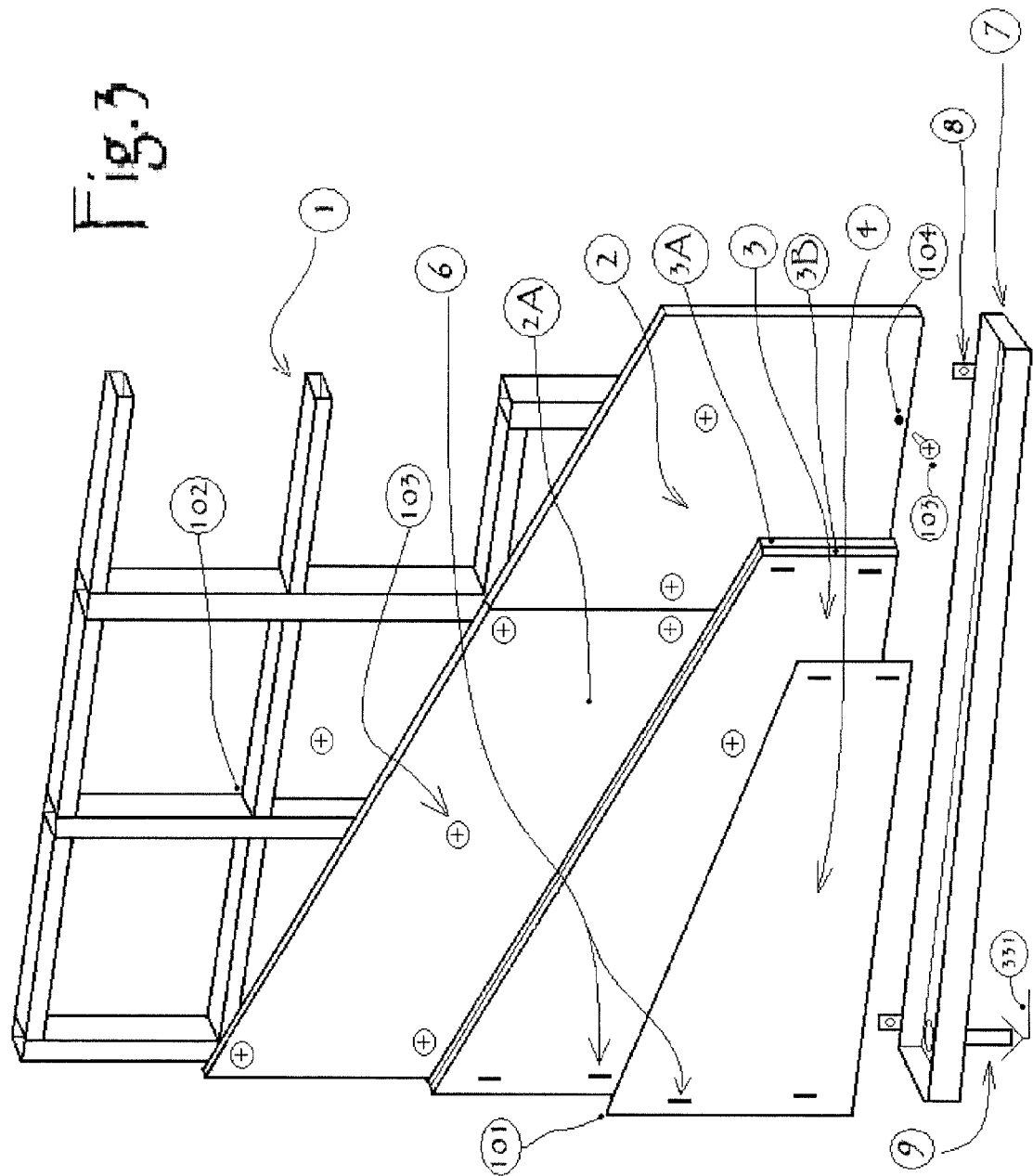
FIG. 3 is a perspective view showing the structural components of the wall.

Referring first to FIG. 1, a preferred embodiment of the present invention, the invention is comprised of a wall 101 and an irrigation system 201, as shown. Irrigation system 201 is used to supply water and nutrients to live matter growing along wall 101. Referring to FIG. 3, a complete wall with live matter therealong and generally indicated at 101 is shown. In a preferred embodiment, wall 101 of the inventive system is a multi-layer formation. As can be seen in FIG. 3, wall 101 includes a first layer comprising a structural mesh frame 102 made from a plurality of rods defined by aluminum squares, such as Aluminum 6063T5 or equivalent, with preferred dimensional cross-sections of two inches by two inches. Rods 1 are preferably hollow aluminum with a thickness in the range of 1.6 mm to 2 mm. Rods 1, as shown in FIG. 3, are generally welded together to form, for example, a mesh frame 102 comprised of two foot by two foot sections. As can be appreciated, multiple such mesh frame sections may be assembled together so as to form larger walls. As also can be appreciated, the sections of mesh frame 102 may vary in size generally from two-foot-by-two-foot to four-foot-by-four-foot. Other materials may also be used, such as galvanized steel studs or even a wood-framed wall with a waterproof membrane disposed there over.

Figure 4:
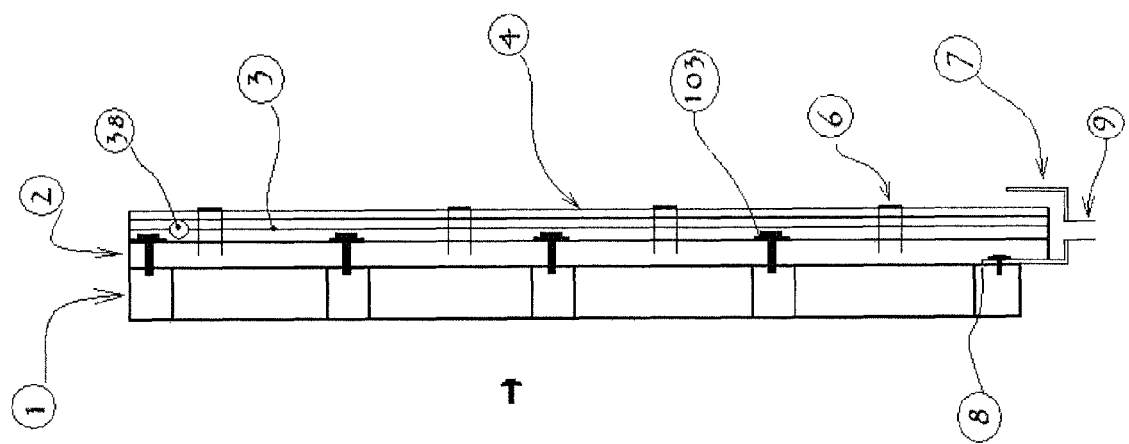
FIG. 4 is a side elevational view showing the structural components of the wall.

Wall 101 is provided with a custom made gutter 7 that is equipped with a depending drain pipe 9, is shown in FIG. 3 and in FIG. 4, while the gutter is attached to structural mesh frame 102 by means of brackets 8. In a preferred embodiment, brackets 8 are welded to gutter 7 and attached to mesh frame 102 by means of screws 103 which are threaded into pre-drilled screw holes 104.

Continuing with FIG. 3, wall 101 also includes solid wall element 2 comprised of expanded polyvinyl chloride (PVC) and installed along structural mesh frame 102 and over brackets 8 in order to form a generally vertical surface. Wall element 2 is connected to mesh frame 102 by means of non-rusting screws 103. Expanded PVC is preferred for element 2 due to its characteristics of smoothness, structural integrity, lack of porousness, and longevity. Element 2 has a typical wall thickness preferably of 10 mm and generally not to exceed 15 mm, and a density preferably of 0.55 g/cm$^3$ and generally not to exceed 0.70 g/cm$^3$. Staples 6 are used to attach additional elements, such as additional absorbent layers 3 and any added covering 4, to wall element 2.

In accordance with the invention, alternative materials and dimensions may be used. These include standard galvanized studs and marine plywood with a waterproof membrane. Depending upon the size of wall element 2, multiple wall elements may be used and aligned along side one another. Specifically shown in FIG. 3, wall elements 2 and 2A are abuttingly disposed one next to the other. Significantly, the bottom of wall element 2 must extend sufficiently far into gutter 7 in order to avoid backsplash. Further, and in accordance with the inventive system, excess water is collected by gutter 7 and is transported to drain pipe 9 which carries the waste water to a waste line 331 or to an optional recycling system, the latter being shown in FIG. 5.

Figure 6:
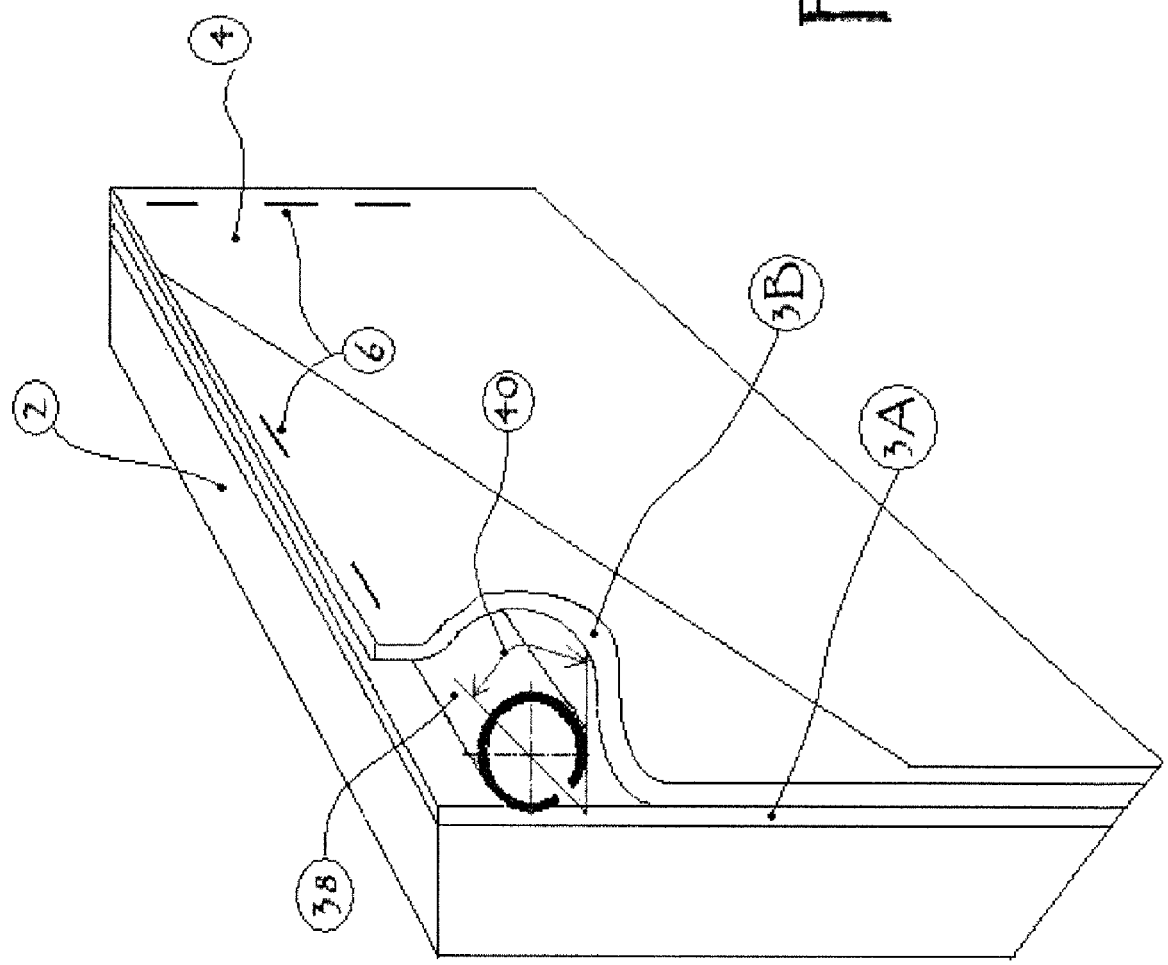
FIG. 6 is a perspective view showing the structure of the irrigation pipe.
Figure 7:
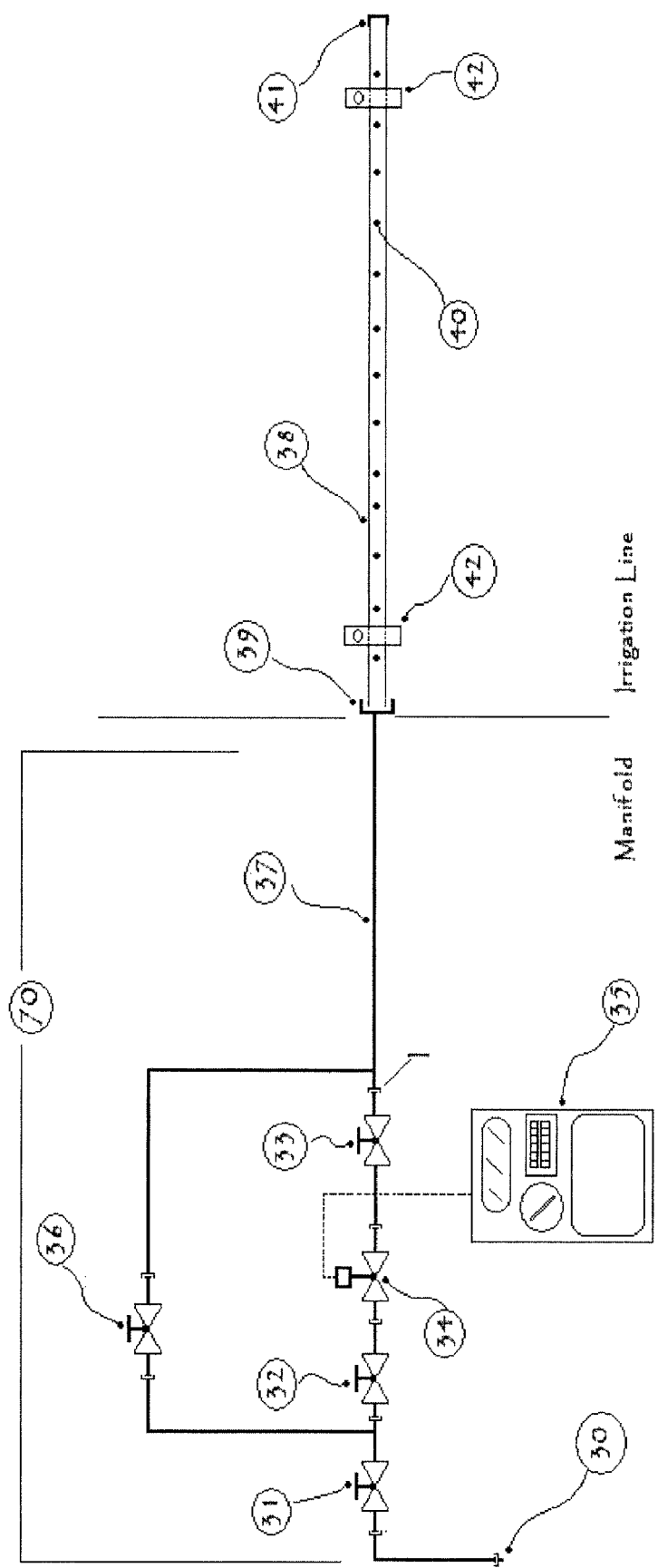
FIG. 7 is a schematic view showing the manifold and the irrigation line.

In a preferred embodiment of the wall of the inventive system and as can be seen in FIG. 3, one side of the surface of wall 101 is covered with a plurality of layers 3 of an absorbent material, such as Aquanape Feutre horticole, such as which often is used as carpet padding recycled felt, with a density of 350 g/m$^2$ within a typical density range of from 250 g/m$^2$ to 400 g/m$^2$. Equivalent materials for providing for absorbency, retention, and the release of liquids may also be used, such as felt. At the upper most portion of wall 101, two layers 3A and 3B made from an absorbent material are sufficiently separated from one another in order to encircle an irrigation line 38, as best shown in FIG. 6. Irrigation line 38 is connected to wall 101 by a pipe clamp 42, such as a Twin Talon pipe clamp with screw bulk buckets, as can be seen in FIG. 7. In addition, in order to improve the finish appearance or shading, a fishnet covering 4, such as 50% Shade and Windbreak netting which is often used for greenhouse shading, may be attached or otherwise applied over absorbent layer 3B (see FIG. 3).

Figure 2:
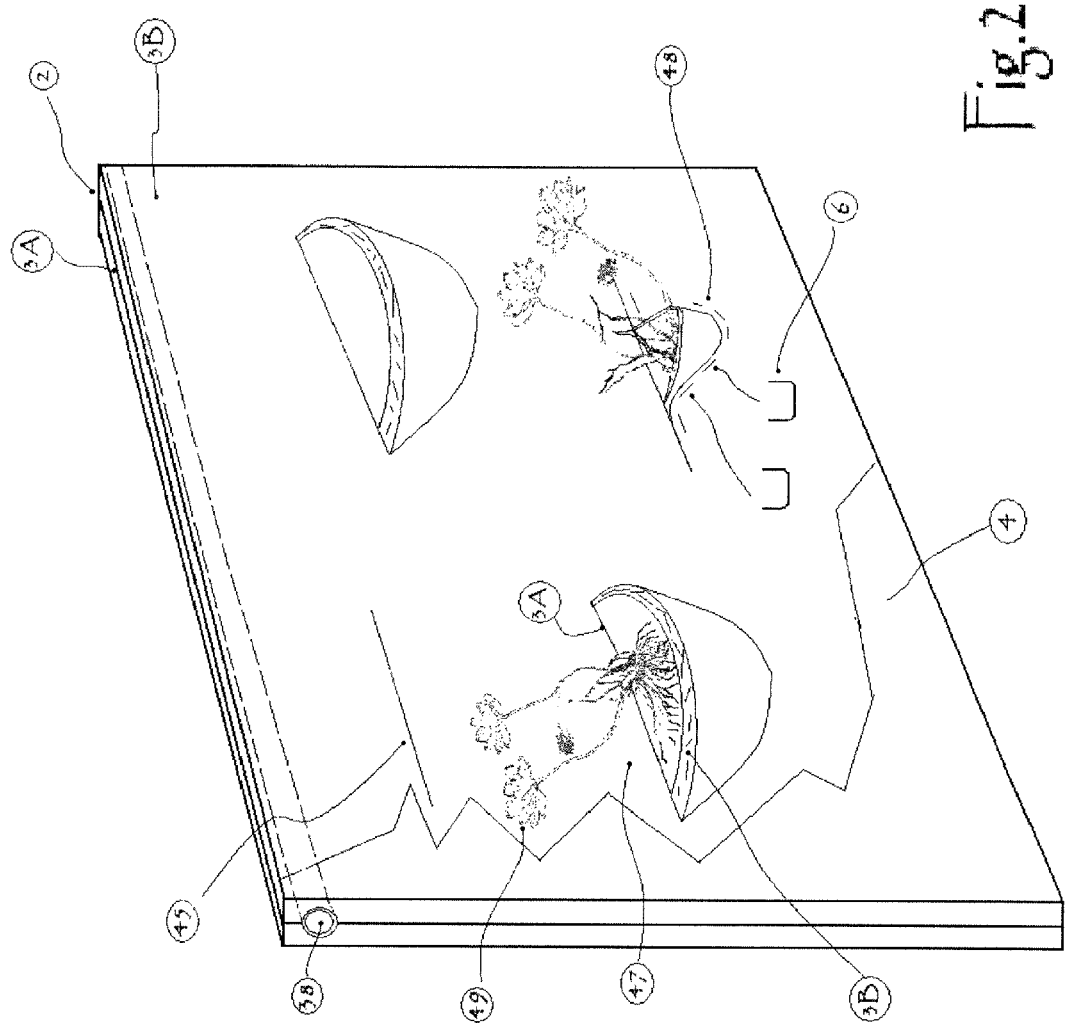
FIG. 2 is a perspective view showing the plant installation in a plurality of absorbent layers.

In a preferred embodiment, wall 101 is generally flat. As can be seen in FIG. 2, an outer layer 3B of the plurality of absorbent layers 3 and any additional fishnet covering 4 is sliced, as can be seen in slice 45. A plant 49 is placed between absorbent layer 3B and absorbent layer 3A. Staples 6 are then stapled along the lower circumference of the plant area forming seam 48 so as to provide additional structural integrity to the absorbent layer surrounding plant 49. These staples, together with the surface tension of absorbent layer 3B keep plant 49 in place.

The present invention includes an associated irrigation system (see FIGS. 1, 7 and 8), including at least one associated irrigation line 38 (as depicted in FIG. 7). A fresh water supply 10 is used to fill a tank 11. An anti-flooding solenoid valve 13, such as WCKRS Watercop Corporal Kit, or equivalent, is used to avoid overflow. Tank 11 is equipped with a floating check valve 14 to stop the water input when the level is too high inside tank 11. A manual CPVC ball valve 15 is used to drain the fresh water from the tank to permit a cleaning of tank 11 during maintenance operation. Drain pipe 16 is used to continue water flow exiting ball valve 15.

Figure 8:
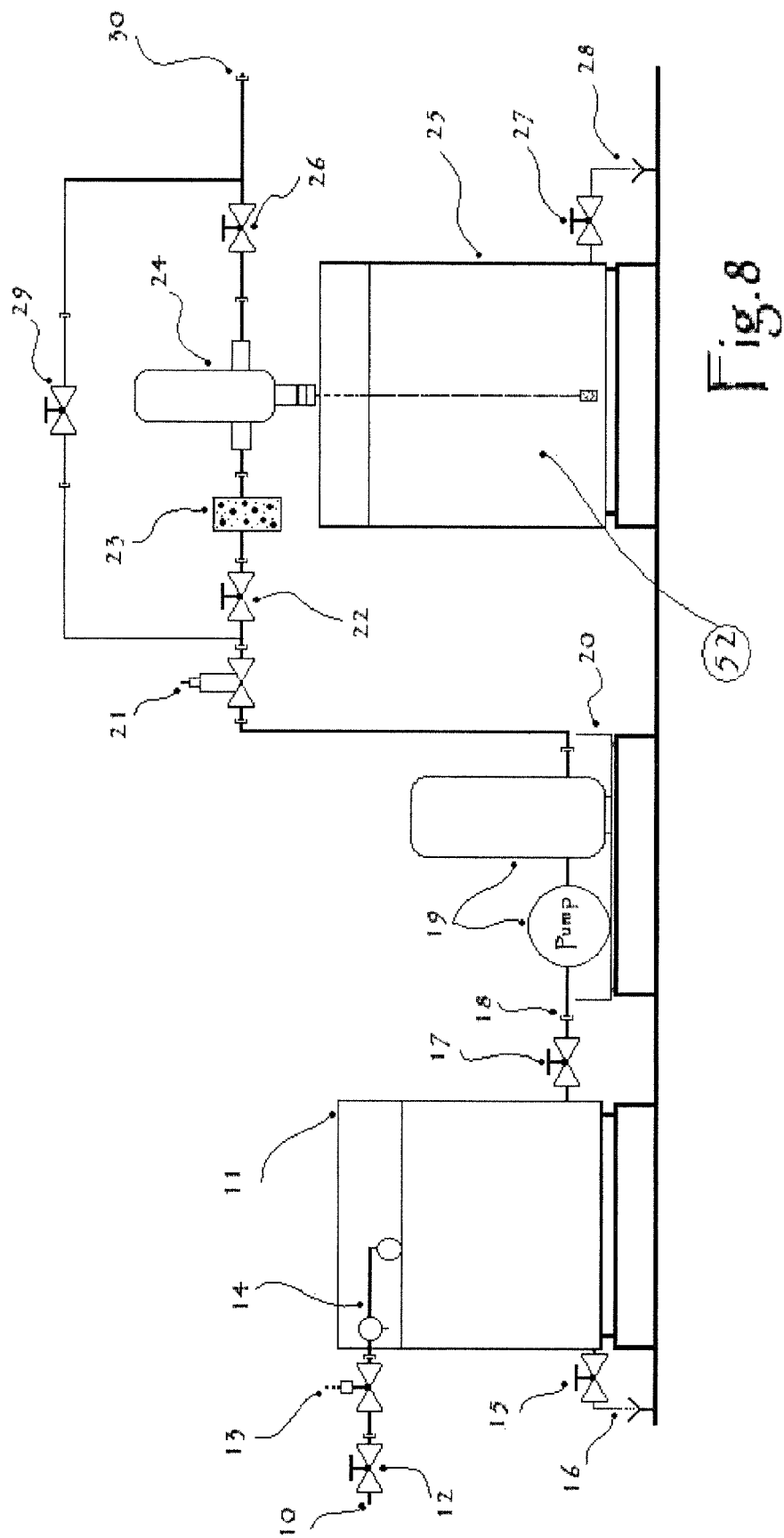
FIG. 8 is a schematic view showing the irrigation system.

Valve 17 is used to isolate the booster pump for maintenance operation and to keep the fresh water in tank 11. As can be seen in FIG. 8, a booster pump 19, such as Davey Pump Pressure Booster 18 GPM 3/4 HP 115 Volt# HS18-30HT1, may be required for pumping water or a water/nutrient mix from water line 18 to a valve 21. Booster pump 19 should preferably be installed on a non-rusting and preferably galvanized steel custom made pan 20 to prevent any flood or any leak on the floor. The size of pump 19 is calculated based on maintaining the requisite flow of fluid in irrigation line 38 at the top of wall 101, which in turn is based on the water needs of the live plant matter disposed there along. Ideally, absorbent material 3 is fully saturated with no run off to gutter 7

As can be seen in FIG. 8, the irrigation system also includes a nutritive tank 25, which stores a nutritive solution 52. Nutritive solution 52 may vary based on the vegetation being grown, but may, for example, be made with a dry concentrate nutrient diluted in fresh water, such as MAXIGRO™ Dry Concentrated Nutrient. Alternatively, a liquid nutrient can be used, such as FLORANOVA™ SERIES Liquid Super Concentrated Nutrient. An additional pump 24, preferably a Dosatron-manufactured DI210 or an alternative with similar metering and dosing capabilities, is included in the system for extracting nutritive solution 52 from inside nutritive tank 25 for subsequent mixing with the water originating from tank 11. Valves 22, 26, and 29 are used to isolate mesh filter 23 and pump 24 for maintenance operation. If pump 24 fails, the wall may be irrigated manually with only fresh water.

Accordingly, after passing through mesh filter 23, water from booster pump 19 flows into and through pump 24. Pump 24 sucks out a metered quantity of the nutritive solution (approximately 0.1 grams of nutrient per liter of solution but not more than 0.3 grams per liter of nutrients) from nutritive tank 25, mixes water from filter 23 with nutritive solution 52, and directs this mixture to manual ball valve 26. Manual ball valve 26 may be used to stop flow so as to allow for system maintenance. Nutritive tank 25 is also equipped with a manual ball valve 27 and drain 28 to permit maintenance, such as cleaning of tank 25. The water and the nutritive solution mix is then directed to an irrigation line 30 for eventual delivery to irrigation line 38 (see FIG. 7).

Figure 9:
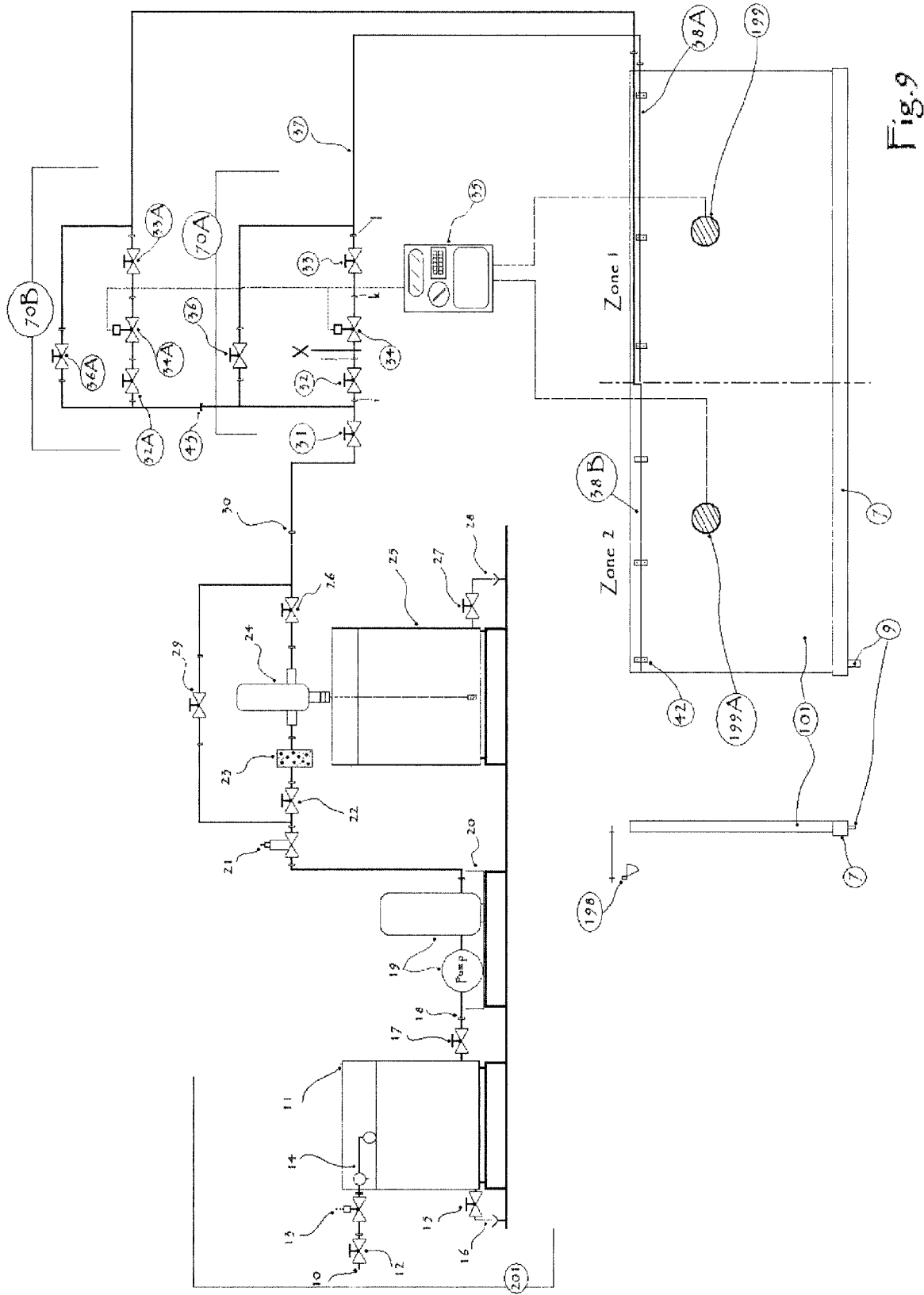
FIG. 9 is a schematic view of a multi-zone irrigation system with artificial lighting.

Continuing with the operation of the inventive system, the water and nutritive solution mix enters a manifold 70 as shown in FIG. 7. The purpose of the manifold is to open and close automatically the irrigation flow. The manifold 70 is equipped with an isolation CPVC manual ball valve 31, two (2) isolation CPVC manual ball valves, 32 and 33, and a Solenoid valve 34, such as 100-PEB: one inch (26/34) industrial-strength glass-filled nylon globe valve for commercial applications from Rain Bird corporation, or the equivalent. Solenoid valve 34, is connected to a Timer/Controller, 35, such as ESP-LX+ and ESP-LXi+ Series from Rain Bird Corporation or the equivalent. Manifold 70 attaches and delivers water to irrigation line 37. Irrigation line 37 is preferably made of 0.75 inch diameter, but may be of up to 2 inches in diameter. Irrigation line 37 may not have a diameter larger than that of line 38. Irrigation line 37 is preferably of PVC, but may be comprised of a material of similar structural integrity, lack of porousness, and longevity, such as another plastic. Irrigation line 37 permits the flow of the mixture to irrigation line 38. The water and nutritive mix thereby continue to flow through irrigation line 38, which is installed at the top of wall 101, as shown in FIGS. 6 and 9. Irrigation lines 37 and 38 are joined together by union coupling 39. The total number of irrigation fines disposed at the top of wall 101 is determined by the total linear length of the wall based upon the maximum length of one irrigation line. Multiple irrigation lines are connected serially by removable plumbing clamp 42, which attach irrigation line 38 to the wall. At the distal end of the serial irrigation line or lines a union cap 41 is provided in order to preclude water runoff.

One feature of the inventive system is the unique arrangement of the irrigation lines at the top of wall 101. In particular, irrigation line 38 is installed at the top of wall 101 between two of the plurality of absorbent layers, as previously described. As can be seen in FIG. 7, irrigation line 38 has numerous holes 40. Holes 40 of irrigation line 38 should be oriented at approximately 45 degrees with respect to the surface of wall 101 so that the water solution will drip uniformly against the wall and within the absorbent layers. The line may be oriented at up to 80 degrees. However, the line should remain in line with the horizontal dimension of the wall.

Irrigation line 38 is preferably made from PVC tubing of 0.75 inch diameter, although other plastic, non-corrosive materials with similar properties to that of PVC pipe may be used. The irrigation system (see FIG. 7 and FIG. 8) includes piping 37, valves isolation valve 31, ball valves 32 and 33, Solenoid valve 34, by-pass valve 36, a timer/controller 35, metering pump 24, and optional booster pump 19. The function of valve 31 is to isolate the entire manifold 70 for maintenance operation. The function of valves 32 and 33 is to isolate solenoid valve 34 for maintenance operation. Valve 34 is a solenoid valve controlled by timer/controller 35 to start and stop the irrigation cycle.

Figure 5:
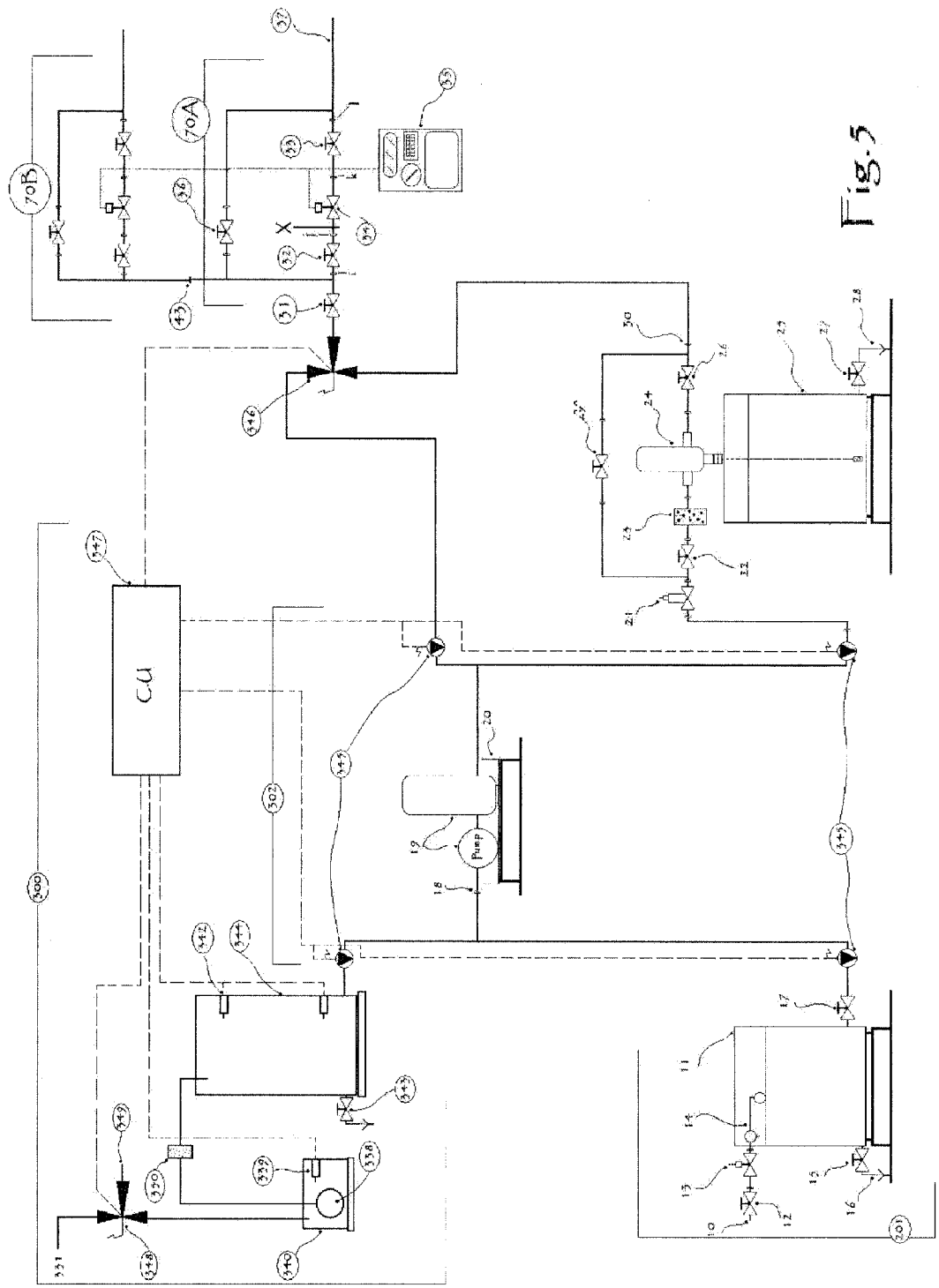
FIG. 5 is a schematic view showing the recycling system in the context of the overall system.

In accordance with the invention, a zoning plan of irrigation lines is created in order to cover all linear sizes of a hydroponic wall, as can best be seen in FIG. 6 by inclusion of irrigation line 38 with orientation of its holes 40. FIG. 6 shows the placement of the irrigation line. The irrigation system may connect to a recycling system 300, as shown in FIG. 5.

Once the inventive system is set up, as shown in FIG. 1, living plant matter may be placed along two of the absorbent layers 3 by displacing them inside the protrusion/cavity formations, as shown in FIG. 2.

In accordance with the present invention, live plant matter may be able to grow on both sides of wall 101 concurrently. To create such a double-faced hydroponic surface, the construction details set forth above are repeated along the opposite side of mesh frame 102. In other words, the other side of wall 101 includes a solid wall element 2 made of expanded PVC, and a plurality of absorbent layers 3 for surrounding irrigation line 38 near the top of wall 101 as well as a plants inserted between two of said absorbent layers through a slice in an outer absorbent layer secured by staples. As can be appreciated, if wall 101 is arranged for live plant matter growth on both sides, two irrigation lines or two sets of irrigation lines may be needed.

The multi-zone process works with timer controller 35. Timer controller 35 is able to control up to 24 zones or irrigation line. A special cycle may be pre-set for each zone, within the programmability of timer controller 35. Each zone will separately irrigate the wall.

In one embodiment of the present invention, water flow may be adjusted based upon wall humidity. Referring to FIG. 1, humidity probe 199 is attached to wall 101. Humidity probe 199 provides humidity readings to timer/controller 35. Timer/controller 35 is programmed to turn on or off based upon humidity measurements.

In another embodiment of the present invention, artificial lighting may supplement or replace natural lighting necessary for plant growth. Referring to FIG. 9, track light 198 is installed approximately one foot above the tip of the wall and forward of the growing surface preferably by three feet, but generally from one to three feet forward.

In another embodiment, the inventive irrigation system delivers waste water to a recycling system, as can be seen in FIG. 5. Solenoid valve 348 directs the flow from drain pipe 331. The recycling system is controlled by a control unit 347. When the recycling system is activated, the three-way solenoid valve 348 is used to open the waste line 349 instead of the recycling system line. When the recycling system is activated, a fresh water supply 10, is replaced by water from piping 302. Water in piping 302 is produced by recycling the water/nutrient mix. Waste water from gutter 7 and drain pipe 9 collects in drain line 331. Level probe 339 controls pump 338 inside gutter tank 340. The tank is filled by waste water from drain line 331. Pump 338 fills recycling tank 344. Tank 344 is equipped with a manual ball drain valve 343 for maintenance operation and receives the waste water coming from valve 348. Top level probe 342 is used for triggering the system. When the water level reaches the top level probe, control unit 347 activates valve 345. This valve allow for the substitution of fresh water supply with recycled water from recycling tank 344 and also causes the shut down of pump 24 for nutritive solution 52. Water from tank 344 is fed through piping 302 to three-way solenoid valve 346 in order to supply water directly to the irrigation manifold 70.

FIG. 9 includes a schematic diagram of the present invention with multiple zones. As can be appreciated from FIG. 9, each manifold has a valve 34 which is controlled by timer/controller 35. For zone 1, when humidity sensor 199 recognizes that zone 1 has sufficient humidity or water content, timer/controller 35 turns valve 34 off. Similarly for zone 2, when humidity sensor 199A recognizes that zone 2 has sufficient humidity or water content, timer/controller 35 turns valve 34A off. When the humidity is too low in a zone, timer/controller 35 turns the appropriate valve or valves back on. Timer/controller 35 may be programmed for different humidity levels for different zones.

It will thus be seen that the objects set forth above, among those made apparent from the preceding description, are efficiently attained and, since certain changes may be made in carrying out the above process, in the described product, and in the construction set forth without departing from the spirit and scope of the invention, it is intended that all matter contained in the above description and shown in the accompanying drawings shall be interpreted as illustrated and not in a limiting sense.

It is also to be understood that the following claims are intended to cover all of the generic and specific features of the invention herein described, and all statements of the scope of the invention which, as a matter of language, might be said to fall therebetween.

I claim:

1. An apparatus for hydroponically growing live vegetation comprising
    a wall including a wall frame and a plurality of absorbent layers thereon for selectively retaining water and within which a plant grows;
    an irrigation system comprising a source for said water and piping for distributing said water along said wall;
    a system for collecting water not absorbed by said wall, and
    a metering mechanism for controlling the flow rate of water for the irrigation system, wherein said metering mechanism selectively provides differing flow rates to different portions of said wall.

2. The apparatus of claim 1, further comprising a mechanism for recycling water not retained from said wall.

3. The apparatus of claim 2, wherein said mechanism for recycling comprises an element for cleansing said not retained water from said wall.

4. The apparatus of claim 3, wherein said mechanism for recycling comprises a means for mixing said cleaned waste water with a fresh water supply.

5. The apparatus of claim 1, further comprising a shading layer disposed along the top of the wall.

6. The apparatus of claim 1, wherein said apparatus is lit by artificial lighting located proximate to the apparatus.

7. The apparatus of claim 1, wherein the surface of said wall is comprised of expanded PVC.

8. The apparatus of claim 1, wherein said absorbent layers comprise a felt material.

9. The apparatus of claim 1, wherein said apparatus further comprises a humidity control mechanism for maintaining the moisture level of the wall.

10. The apparatus of claim 1, wherein said wall frame comprises a plurality of layers of absorbent material on both of said wall frame.

11. The apparatus of claim 1, wherein said apparatus further comprises a booster pump for increasing the flow rate of water.

12. The apparatus of claim 1, wherein said irrigation system comprises a mechanism for delivering nutrients into said piping.

13. The apparatus of claim 1, further comprised of a series of staples for retaining live matter within the plurality of absorbent layers.

* * * * *